(12) United States Patent
Okoshi et al.

(10) Patent No.: US 10,670,122 B2
(45) Date of Patent: Jun. 2, 2020

(54) AUTOMATIC TRANSMISSION

(71) Applicant: AISIN AW CO., LTD., Anjo-shi, Aichi-ken (JP)

(72) Inventors: Naoki Okoshi, Anjo (JP); Tomoya Hirao, Anjo (JP); Masashi Takizawa, Anjo (JP); Keita Shindo, Anjo (JP); Kazuya Inaba, Kariya (JP)

(73) Assignee: AISIN AW CO., LTD., Anjo (JP)

( * ) Notice: Subject to any disclaimer, the term of this patent is extended or adjusted under 35 U.S.C. 154(b) by 239 days.

(21) Appl. No.: 15/763,656

(22) PCT Filed: Oct. 25, 2016

(86) PCT No.: PCT/JP2016/081556
§ 371 (c)(1),
(2) Date: Mar. 27, 2018

(87) PCT Pub. No.: WO2017/073552
PCT Pub. Date: May 4, 2017

(65) Prior Publication Data
US 2018/0274643 A1    Sep. 27, 2018

(30) Foreign Application Priority Data

Oct. 30, 2015  (JP) ................................ 2015-213888

(51) Int. Cl.
*F16H 37/02*  (2006.01)

(52) U.S. Cl.
CPC ..... *F16H 37/021* (2013.01); *F16H 2037/026* (2013.01)

(58) Field of Classification Search
CPC ................................................ F16H 2037/026
See application file for complete search history.

(56) References Cited

U.S. PATENT DOCUMENTS

| 4,901,597 | A | * | 2/1990 | Hattori | .................. | F16H 37/021 |
| | | | | | | 475/66 |
| 2015/0087452 | A1 | * | 3/2015 | Yoshino | ................ | F16H 37/021 |
| | | | | | | 474/1 |
| 2015/0107410 | A1 | * | 4/2015 | Yoshida | ................ | F16H 37/021 |
| | | | | | | 74/664 |
| 2015/0135894 | A1 | * | 5/2015 | Kobayashi | ............ | F16H 37/021 |
| | | | | | | 74/664 |

(Continued)

FOREIGN PATENT DOCUMENTS

| JP | S61-074958 A | 4/1986 |
| JP | S63-057957 A | 3/1988 |

(Continued)

OTHER PUBLICATIONS

Jan. 31, 2017 International Search Report issued in Patent Application No. PCT/JP2016/081556.

*Primary Examiner* — William Kelleher
*Assistant Examiner* — Gregory T Prather
(74) *Attorney, Agent, or Firm* — Oliff PLC (57) ABSTRACT

An automatic transmission where the first engagement element is positioned between the continuously variable speed change mechanism and a portion of the second power transmission path on the wheel side, at which the second power transmission path is coupled to the first power transmission path, and is allowed to be switched to the disengaged state for inertial traveling.

10 Claims, 3 Drawing Sheets

| mode | C1 | C2 | TWC |
|---|---|---|---|
| Fw | O | | |
| Rev | | O | (O) |

(56) References Cited

U.S. PATENT DOCUMENTS

| | | | |
|---|---|---|---|
| 2015/0167802 A1* | 6/2015 | Yoshida | F16H 37/022 475/211 |
| 2015/0354682 A1* | 12/2015 | Yamamoto | F16H 37/0846 475/198 |
| 2016/0025161 A1* | 1/2016 | Matsuo | F16D 48/062 477/180 |
| 2016/0052522 A1* | 2/2016 | Matsuo | F16H 61/0262 74/664 |
| 2016/0091090 A1* | 3/2016 | Kimura | F16H 61/66259 474/11 |
| 2016/0102741 A1* | 4/2016 | Uchino | F16H 37/021 474/8 |
| 2016/0121896 A1* | 5/2016 | Matsuo | B60W 10/02 701/53 |
| 2016/0131255 A1* | 5/2016 | Taninaka | F16H 37/022 477/115 |
| 2016/0131256 A1* | 5/2016 | Toyoda | F16H 61/0204 701/51 |
| 2016/0186846 A1* | 6/2016 | Kidokoro | F16H 37/022 474/8 |
| 2016/0305522 A1* | 10/2016 | Fukao | B60K 17/00 |
| 2016/0334010 A1* | 11/2016 | Nitani | F16H 61/04 |
| 2016/0347317 A1* | 12/2016 | Fukao | F16H 61/66259 |
| 2017/0037965 A1* | 2/2017 | Inoue | F16H 37/022 |
| 2017/0037966 A1* | 2/2017 | Nakamura | B60W 30/20 |
| 2017/0114895 A1* | 4/2017 | Hattori | F16H 61/66259 |
| 2017/0146104 A1* | 5/2017 | Tsuchida | F16H 37/022 |
| 2017/0146121 A1* | 5/2017 | Tsuchida | F16H 61/662 |
| 2017/0159814 A1* | 6/2017 | Fukao | F16H 61/66272 |
| 2018/0080552 A1* | 3/2018 | Iwasa | B60K 6/48 |
| 2018/0180147 A1* | 6/2018 | Chida | F16D 21/08 |
| 2018/0306275 A1* | 10/2018 | Takeda | F16H 1/2845 |
| 2019/0202280 A1* | 7/2019 | Cho | F16H 37/021 |
| 2019/0316674 A1* | 10/2019 | Hattori | F16H 1/12 |

FOREIGN PATENT DOCUMENTS

| | | |
|---|---|---|
| JP | 2002-048213 A | 2/2002 |
| JP | 2014-206235 A | 10/2014 |

* cited by examiner

| mode | C1 | C2 | TWC |
|---|---|---|---|
| Fw | ○ | | |
| Rev | | ○ | (○) |

AUTOMATIC TRANSMISSION

BACKGROUND

The present disclosure relates to an automatic transmission that has a continuously variable speed change mechanism capable of changing the speed in a stepless manner while drivably coupling a driving source and wheels, for example.

Vehicular automatic transmissions that are installed with a continuously variable speed change mechanism, such as a belt-type continuously variable speed change mechanism (CVT), have become commonly available. For example, there is a known automatic transmission installed with a belt-type continuously variable speed change mechanism, which has a forward-reverse switching mechanism interposed between a primary pulley of the belt-type continuously variable speed change mechanism and an internal combustion engine. However, in this automatic transmission, holding pressure in the belt-type continuously variable speed change mechanism is necessary during both forward traveling and reverse traveling. Therefore, reduction in the burden on the internal combustion engine has been desired. Thus, an automatic transmission that uses a gear train that is exclusive to reverse traveling and fixes the speed ratio so as not to use the belt-type continuously variable speed change mechanism when a vehicle is traveling in reverse has been developed. For example, there is a known automatic transmission, including an input shaft that is drivably coupled to an internal combustion engine, an output shaft that is drivably coupled to wheels, a belt-type continuously variable speed change mechanism that is capable of coupling the input shaft and the output shaft, and the gear train that is capable of coupling the input shaft and the output shaft (see Japanese Patent Application Publication No. 63-57957). In this automatic transmission, the input shaft, a mechanism that connects/disconnects with the gear train, a forward clutch, and a primary pulley are disposed in order on a first axis. A secondary pulley, a reverse clutch, and the output shaft are disposed in order on a second axis that is parallel to the first axis.

In this automatic transmission, for forward traveling, the forward clutch is engaged and the input shaft and the continuously variable speed change mechanism are connected, the connecting/disconnecting mechanism is disconnected and the input shaft and the gear train are disconnected, and the reverse clutch is disengaged and the gear train and the output shaft is disconnected, so that the rotation of the input shaft is transmitted to the output shaft via the forward clutch and the continuously variable speed change mechanism. In this automatic transmission, for reverse traveling, the forward clutch is disengaged and the input shaft and the continuously variable speed change mechanism is disconnected, the connecting/disconnecting mechanism is connected and the input shaft and the gear train are connected, and the reverse clutch is engaged and the gear train and the output shaft are connected, so that the rotation of the input shaft is transmitted to the output shaft via the connecting/disconnecting mechanism, the gear train, and the reverse clutch. In this automatic transmission, the driving force can be transmitted without the intervention of the continuously variable speed change mechanism when a vehicle is traveling in reverse. Therefore, it is possible to eliminate the need for holding pressure and reduce the burden on the internal combustion engine.

SUMMARY

However, in the automatic transmission according to Japanese Patent Application Publication No. 63-57957, the secondary pulley and the output shaft are directly connected. Thus, when a vehicle traveling forward decelerates to travel at low speed and idling stop control is executed to stop the internal combustion engine, the holding pressure needs to be generated by using an electric oil pump for example, in order to prevent the belt from slipping due to the holding pressure of the continuously variable speed change mechanism reduced when a mechanical oil pump stops.

An exemplary aspect of the disclosure provides an automatic transmission that is able to switch between forward traveling that uses the continuously variable speed change mechanism and reverse traveling that uses a gear train rather than the continuously variable speed change mechanism, while not needing other holding pressure generating portions such as the electric oil pump even when the generation of holding pressure stops due to the driving source stopped during the idling stop control.

An automatic transmission of the present disclosure includes: an input shaft drivably coupled to a driving source of a vehicle; an output shaft drivably coupled to a wheel; a continuously variable speed change mechanism capable of continuously changing a speed ratio; a first engagement element that is interposed in a first power transmission path that couples the input shaft and the output shaft via the continuously variable speed change mechanism, and connects and disconnects power transmission by being switched to an engaged state for forward traveling and a disengaged state for reverse traveling; a second engagement element that is interposed between the input shaft and a gear train, in a second power transmission path that couples a portion of the first power transmission path on the driving source side of the continuously variable speed change mechanism and the first engagement element and a portion of the first power transmission path on the wheel side of the continuously variable speed change mechanism and the first engagement element via the gear train, and connects and disconnects power transmission by being switched to the engaged state for reverse traveling; and a third engagement element that is disposed closer to the wheel than the second engagement element in the second power transmission path and connects and disconnects power transmission by being switched to the disengaged state, if at least the second engagement element is in the engaged state, for forward traveling, and to the engaged state for reverse traveling, wherein the first engagement element is positioned between the continuously variable speed change mechanism and a portion of the second power transmission path on the wheel side, at which the second power transmission path is coupled to the first power transmission path, and is allowed to be switched to the disengaged state for inertial traveling.

In the automatic transmission, the first engagement element is positioned between the continuously variable speed change mechanism and a portion of the second power transmission path on the wheels side, at which the second power transmission path is coupled to the first power transmission path. At the same time, the first engagement element can be switched to the disengaged state for inertial traveling. When idling stop control is executed during deceleration and before stopping, the first engagement element is switched to the disengaged state so that the driving source and the continuously variable speed change mechanism stop with the wheels rotating, which prevents the belt from slipping. Thus, it is possible to switch between forward traveling that uses the continuously variable speed change mechanism and reverse traveling that does not use the continuously variable speed change mechanism but uses the gear train. Also, other holding pressure generating portions such as an electric oil pump are unnecessary even when holding pressure is no longer generated due to the stoppage of the internal combustion engine during idling stop control.

DETAILED DESCRIPTION OF EMBODIMENTS

An embodiment of an automatic transmission 3 will be described below with reference to FIG. 1A. A vehicle 1 installed with the automatic transmission 3 includes an internal combustion engine (a driving source) 2, the automatic transmission 3, an ECU 4 and a hydraulic control device 5 that control the automatic transmission 3 and wheels 8L, 8R etc. The internal combustion engine 2 is an internal combustion engine such as a gasoline engine or a diesel engine etc., and is coupled to the automatic transmission 3. In the present embodiment, the automatic transmission 3 is of a so-called FF (front engine-front drive) type. However, the automatic transmission 3 is not limited to an FF type, and may also be of an FR (front engine-rear drive) type.

The automatic transmission 3 includes an input shaft 30 of the automatic transmission 3, a starting device 10, a continuously variable speed change mechanism 40, a gear train 50, a counter shaft portion 60, a differential device 80, left and right drive shafts 82L, 82R, and a transmission case 90 that houses such components. The automatic transmission 3 includes axes that are parallel to each other, namely a first axis AX1 to a fourth axis AX4.

The first axis AX1 is coaxial with a crank shaft 20 of the internal combustion engine 2. The input shaft 30 drivably coupled to the crank shaft 20, the starting device 10, an intermediate shaft 31 that is coupled to the output side of the starting device 10, a second clutch (a second engagement element) C2 attached to the intermediate shaft 31, a first gear 32 attached to the second clutch C2, a primary pulley 41 of the continuously variable speed change mechanism 40, and a primary shaft 47 that is the rotary shaft of the primary pulley 41 are disposed on the first axis AX1. The inner periphery of the second clutch C2 is attached to the intermediate shaft 31, while the outer periphery of the second clutch C2 is attached to the first gear 32 so that the second clutch C2 rotates together with the first gear 32.

A secondary pulley 42 of the continuously variable speed change mechanism 40 and a secondary shaft 48 that is the rotary shaft of the secondary pulley 42, an output shaft 33, a first clutch (a first engagement element) C1 that can engage/disengage the secondary shaft 48 and the output shaft 33, a two-way clutch (a third engagement element) TWC, a second gear 34 attached to the two-way clutch TWC, and a drive gear 35 attached to the output shaft 33 are disposed on the second axis AX2. The inner periphery of the two-way clutch TWC is attached to the output shaft 33, while the outer periphery of the two-way clutch TWC is attached to the second gear 34 so that the two-way clutch TWC rotates together with the second gear 34.

A counter shaft 61, a driven gear 62, and a drive gear 63 of the counter shaft portion 60 are disposed on the third axis AX3. The differential device 80 and the left and right drive shafts 82L, 82R are disposed on the fourth axis AX4. The left and right wheels 8L, 8R are provided on the drive shafts 82L, 82R, respectively.

In the automatic transmission 3, a first power transmission path a1 is a power transmission path that couples the input shaft 30 and the output shaft 33 via the continuously variable speed change mechanism 40, and the first clutch C1 is interposed in the first power transmission path a1. In the present embodiment, the first clutch C1 is disposed closer to the wheels 8L, 8R than the continuously variable speed change mechanism 40. The first clutch C1 has multiple friction plates or a single friction plate that is engaged/disengaged by the supply/discharge of hydraulic pressure to/from a hydraulic servo that is not shown, and is a friction engagement element that connects/disconnects power transmission by friction engagement/disengagement between the friction plates. The first clutch C1 can be switched to an engaged state for forward traveling, a disengaged state for reverse traveling, and the disengaged state for inertial traveling, and thus connects/disconnects power transmission.

In the present embodiment, the first clutch C1 is used as the first engagement element that can engage/disengage the secondary shaft 48 and the output shaft 33. However, the present disclosure is not limited to this. The structure of the first engagement element is not limited as long as it can connect/disconnect power transmission, and the first engagement element may be a dog clutch or a two-way clutch etc. as well as a friction engagement element. That is, the first clutch C1 is positioned between the continuously variable speed change mechanism 40 and a portion of a second power transmission path a2, described below, on the wheels 8L, 8R side, at which the second power transmission path a2 is coupled to the first power transmission path a1.

The second power transmission path a2 is a power transmission path that couples a portion of the first power transmission path a1 on the internal combustion engine 2 side of the continuously variable speed change mechanism 40 and the first clutch C1 and a portion of the first power transmission path a1 on the wheels 8L, 8R side of the continuously variable speed change mechanism 40 and the first clutch C1, via the gear train 50. The two-way clutch TWC that connects/disconnects power transmission and the second clutch C2 that is disposed closer to the internal combustion engine 2 than the two-way clutch TWC are interposed in the second power transmission path a2.

The second clutch C2 is a friction engagement element that has multiple friction plates or a single friction plate that is engaged/disengaged by the supply/discharge of hydraulic pressure to/from a hydraulic servo that is not shown, and that connects/disconnects power transmission by friction engagement/disengagement between the friction plates. The second clutch C2 is disposed in a portion of the second power transmission path a2 on the internal combustion engine 2 side, at which the second power transmission path a2 is coupled to the first power transmission path a1, and is interposed between the intermediate shaft 31 that is coaxial with the input shaft 30 and the gear train 50. The second clutch C2 connects/disconnects power transmission by being switched to the engaged state for reverse traveling. In the present embodiment, the second clutch C2 is used as the second engagement element that can engage/disengage the intermediate shaft 31 and the gear train 50. However, the present disclosure is not limited to this. The structure of the second engagement element is not limited as long as it can connect/disconnect power transmission, and the second engagement element may be a dog clutch or a two-way clutch etc. as well as a friction engagement element.

The two-way clutch TWC is disposed in a portion of the second power transmission path a2 on the wheels 8L, 8R side, at which the second power transmission path a2 is coupled to the first power transmission path a1, and is interposed between the output shaft 33 and the gear train 50. The two-way clutch TWC is set to disconnect power transmission from the output shaft 33 to the gear train 50, and connect power transmission from the gear train 50 to the output shaft 33. Thus, the two-way clutch TWC is interposed in the second power transmission path a2 closer to the wheels 8L, 8R than the second clutch C2, and mechanically connects/disconnects power transmission based on engagement/disengagement due to wedge action. The two-way clutch TWC connects/disconnects power transmission by switching to the disengaged state when at least the second clutch C2 is in the engaged state, for forward traveling, and to the engaged state for reverse traveling.

The starting device 10 has a torque converter 11 and a lockup clutch 12 that locks up the torque converter 11. The torque converter 11 is drivably coupled to the continuously variable speed change mechanism 40 via the intermediate shaft 31. The torque converter 11 has a pump impeller 11a that is connected to the input shaft 30 of the automatic transmission 3, a turbine runner 11b to which the rotation of the pump impeller 11a is transmitted via oil that is a working fluid, and a stator 11c that is disposed between the pump impeller 11a and the turbine runner 11b, the rotation of the stator 11c being restricted to one direction by a one-way clutch 11d that is fixed to the case 90. The turbine runner 11b is connected to the intermediate shaft 31. The lockup clutch 12 is able to engage/disengage a front cover 12a and the intermediate shaft 31, and is able to switch the torque converter 11 between a lockup state and a un-lockup state.

The continuously variable speed change mechanism 40 can continuously change the speed ratio. In the present embodiment, a belt-type automatic continuously variable speed change mechanism is used as the continuously variable speed change mechanism 40. It should be noted, however, that the present disclosure is not limited to this, and a toroidal-type continuously variable speed change mechanism or a cone-ring-type continuously variable speed change mechanism, for example, may be used as the continuously variable speed change mechanism 40. The continuously variable speed change mechanism 40 has the primary pulley 41 disposed on the first axis AX1, the secondary pulley 42 disposed on the second axis AX2, and an endless belt (including all endless belts such as a metal push type belt, a metal pull type belt, and a metal ring etc.) 43 that is wound around the two pulleys 41, 42.

The primary pulley 41 has a fixed sheave 41a and a movable sheave 41b that have respective wall surfaces formed in a conical shape so as to face each other, the fixed sheave 41a being fixed so as to be immovable in the axial direction with respect to the primary shaft 47, and the movable sheave 41b being supported so as to be movable in the axial direction with respect to the primary shaft 47. The belt 43 is held by a groove portion with a V-shape in section formed by the fixed sheave 41a and the movable sheave 41b.

The secondary pulley 42 has a fixed sheave 42a and a movable sheave 42b that have respective wall surfaces formed in a conical shape so as to face each other, the fixed sheave 42a being fixed so as to be immovable in the axial direction with respect to the secondary shaft 48, and the movable sheave 42b being supported so as to be movable in the axial direction with respect to the secondary shaft 48. The belt 43 is held by a groove portion with a V-shape in section formed by the fixed sheave 42a and the movable sheave 42b. The fixed sheave 41a of the primary pulley 41 and the fixed sheave 42a of the secondary pulley 42 are disposed on the opposite sides of the belt 43 in the axial direction.

A hydraulic servo 45 is disposed on the back surface side of the movable sheave 41b of the primary pulley 41, and a hydraulic servo 46 is disposed on the back surface side of the movable sheave 42h of the secondary pulley 42.

The gear train 50 is provided connecting the second clutch C2 and the two-way clutch TWC. The gear train 50 has a first idler gear (an idler gear) 51 that meshes with the first gear 32, and a second idler gear (an idler gear) 52 that meshes with the first idler gear 51 and the second gear 34. Thus, the gear train 50 is composed of a plurality of idler gears that reverse the rotation transmitted from the input shaft 30 and transmit the reversed rotation to the output shaft 33.

In the first power transmission path a1, the first clutch C1 is positioned between the continuously variable speed change mechanism 40 and the portion of the second power transmission path a2 on the wheels 8L, 8R side, at which the second power transmission path a2 is coupled to the first power transmission path a1, that is, the two-way clutch TWC.

The counter shaft portion 60 includes the counter shaft 61, and the driven gear 62 and the drive gear 63 that rotate together with the counter shaft 61. The driven gear 62 is meshed with the drive gear 35. The drive gear 63 has a smaller diameter than the driven gear 62 and is meshed with a ring gear 83 of the differential device 80.

The differential device 80 has a differential case 81 that houses a differential gear. The ring gear 83 that has a relatively large diameter is fixed to the differential case 81. The ring gear 83 is connected to the differential gear via the differential case 81. The left and right drive shafts 82L, 82R supported by the differential case 81 are connected to the ring gear 83 via the differential gear. The output rotation that has been changed in speed in a stepless manner by the continuously variable speed change mechanism 40 is transmitted to the differential device 80 via the counter shaft portion 60. Then, the differential rotation of the left and right wheels 8L, 8R is absorbed by the differential device 80 while the output rotation is output to the wheels 8L, 8R that are connected to the left and right drive shafts 82L, 82R. Thus, the output shaft 33 is drivably coupled to the wheels 8L, 8R.

The ECU 4 includes a CPU, a ROM that stores a processing program, a RAM that temporarily stores data, an input/output port, and a communication port, for example, and outputs, from the output port, various types of signals such as a control signal for the hydraulic control device 5. The ECU 4 can switch the automatic transmission 3 between a forward mode and a reverse mode and the like, based on the traveling/stopped state of the vehicle 1 or the acceleration/deceleration intention of the driver.

The hydraulic control device 5 is structured by a valve body for example. The hydraulic control device 5 generates line pressure and modulator pressure etc. with the hydraulic pressure supplied from an oil pump that is not shown, and can supply/discharge hydraulic pressure to control the first clutch C1, the second clutch C2, the continuously variable speed change mechanism 40, and the lockup clutch 12 based on the control signal from the ECU 4.

Figure 1A:
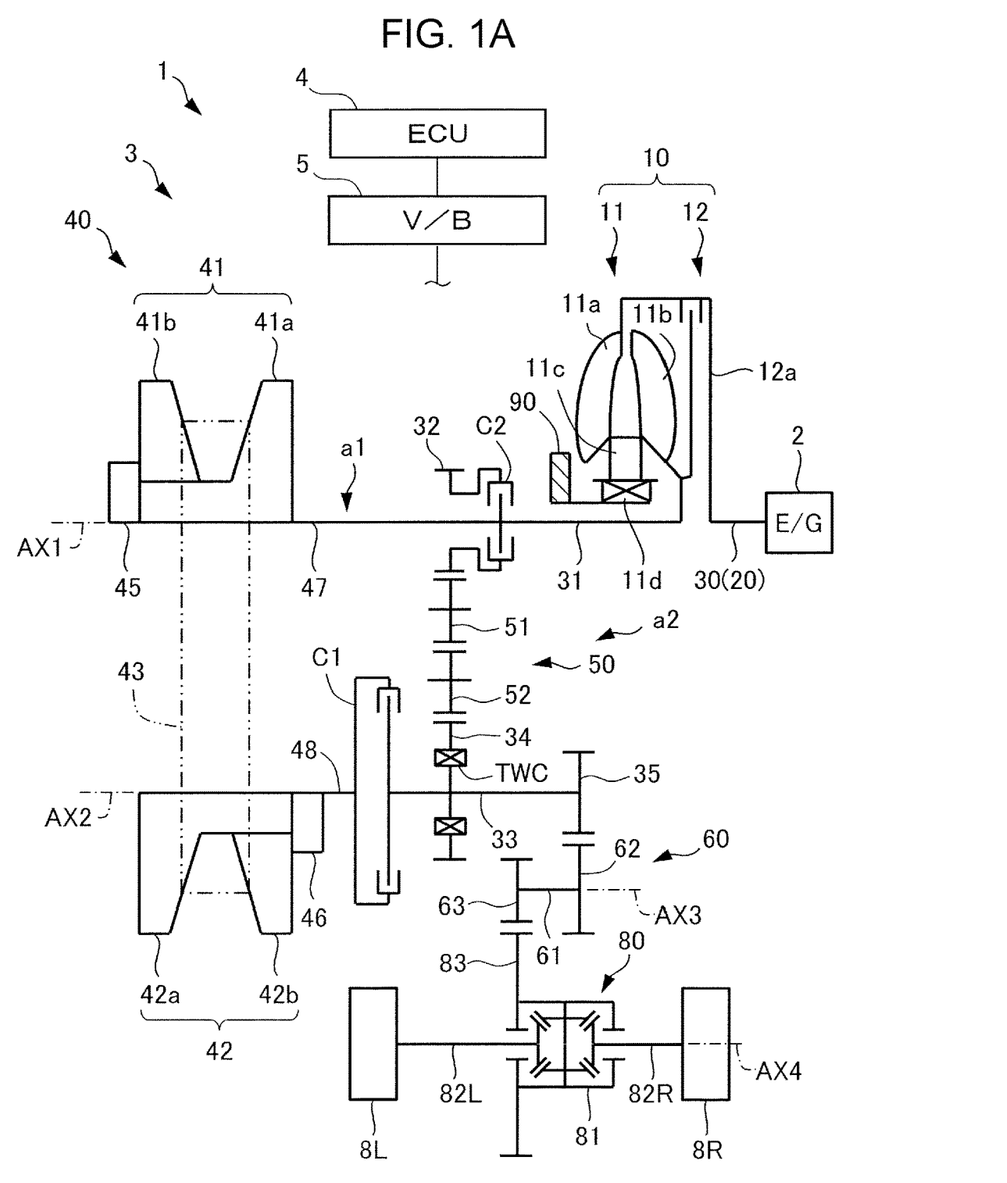
FIG. 1A is a skeleton diagram illustrating a vehicle installed with an automatic transmission according to an embodiment.
Figure 1B:
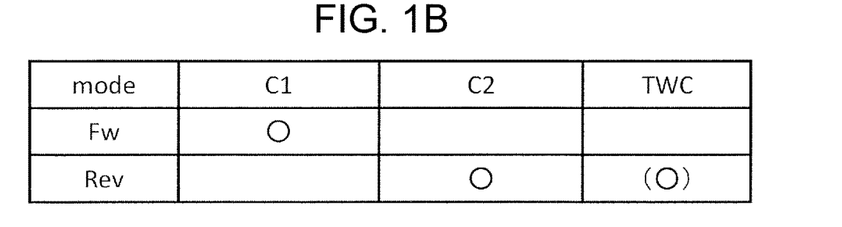
FIG. 1B is an engagement table of the automatic transmission according to the embodiment.

In the automatic transmission 3 structured as described above, either one of the forward mode and the reverse mode is selected and attained, or neither is selected and the automatic transmission 3 is set to a neutral state, by engagement and disengagement of the first clutch C1 and the second clutch C2 illustrated in the skeleton diagram of FIG. 1A according to the combinations indicated in the engagement table of FIG. 1B. In FIG. 1B, the mark "(○)" indicates the state during reverse traveling in which the path from the internal combustion engine 2 to the wheels 8L, 8R is connected, but the path from the wheels 8L, 8R to the internal combustion engine 2 is disconnected, and the engine braking is not applied.

Thus, the ECU 4 causes the first clutch C1 to engage and the second clutch C2 to disengage, and the two-way clutch TWC is mechanically disconnected (disengaged) not by the determination of the ECU 4. The forward mode for forward traveling can be thus executed by transmitting the driving force of the internal combustion engine 2 from the input shaft 30 to the output shaft 33 via the first power transmission path a1. The ECU 4 causes the first clutch C1 to disengage and the second clutch C2 to engage, and the two-way clutch TWC is mechanically connected (engaged) not by the determination of the ECU 4. The reverse mode for reverse traveling can thus be executed by transmitting the driving force of the internal combustion engine 2 from the input shaft 30 to the output shaft 33 via the second power transmission path a2. The ECU 4 can execute the disconnected mode that enables inertial traveling, by causing the first clutch C1 and at least one of the second clutch C2 and the two-way clutch TWC to disengage to disconnect the power transmission between the input shaft 30 and the output shaft 33. In the present embodiment, the ECU 4 enables inertial traveling, by causing the first clutch C1 and the two-way clutch TWC to disengage to disconnect the power transmission between the continuously variable speed change mechanism 40 and the wheels 8L, 8R for the disconnected mode. In the present embodiment, the forward mode is used exclusively for forward traveling, and the reverse mode is used exclusively for reverse traveling.

The operation of the automatic transmission 3 will be described below.

When the vehicle 1 travels forward by the driving force of the internal combustion engine 2 after the internal combustion engine 2 starts, the ECU 4 selects the forward mode and causes the first clutch C1 to engage and the second clutch C2 to disengage. The driving force of the internal combustion engine 2 is transmitted from the input shaft 30 to the intermediate shaft 31 via the starting device 10, and is input to the primary pulley 41. The rotation of the intermediate shaft 31 is not transmitted to the gear train 50 since the second clutch C2 is disengaged.

The rotation of the primary pulley 41 is transmitted to the secondary pulley 42 via the belt 43, and is input to the first clutch C1. The rotation of the secondary shaft 48 is transmitted to the output shaft 33, since the first clutch C1 is engaged. The rotation of the output shaft 33 is not transmitted to the gear train 50, since the two-way clutch TWC is set to disconnect power transmission from the output shaft 33 to the gear train 50. The rotation of the drive gear 35 is transmitted to the differential device 80 via the counter shaft portion 60, and is transmitted to the wheels 8L, 8R through the left and right drive shafts 82L, 82R. In this way, the automatic transmission 3 is set to the forward mode, and the driving force of the internal combustion engine 2 is transmitted to the wheels 8L, 8R via the first power transmission path a1.

When the internal combustion engine 2 is idling or after it has stopped, and the vehicle 1 travels forward by inertia rather than the driving force of the internal combustion engine 2, the ECU 4 determines whether to use engine braking or travel by inertia in a neutral state, that is, select the disconnected mode. When the ECU 4 determines to use engine braking, the ECU 4 causes the first clutch C1 to engage, the second clutch C2 to disengage, and the lockup clutch 12 to engage. The rotation of the wheels 8L, 8R is transmitted to the drive gear 35 and the output shaft 33 via the differential device 80 and the counter shaft portion 60. With the two-way clutch TWC, the rotation of the output shaft 33 is not transmitted to the gear train 50 and is input to the continuously variable speed change mechanism 40 via the first clutch C1. The rotation of the continuously variable speed change mechanism 40 is reversely input to the internal combustion engine 2 via the intermediate shaft 31 and the lockup clutch 12, and engine braking is operated.

When the ECU 4 selects the disconnected mode and determines to put the automatic transmission 3 into a neutral state to enable the vehicle 1 to travel by inertia, the ECU 4 causes the first clutch C1 and the second clutch C2 to disengage. The rotations of the wheels 8L, 8R are transmitted to the drive gear 35 and the output shaft 33 via the differential device 80 and the counter shaft portion 60. The rotation of the output shaft 33 is transmitted to neither the continuously variable speed change mechanism 40 nor the gear train 50. Inertial traveling is achieved without the automatic transmission 3 being subjected to a large braking force.

For reverse travel of the vehicle 1 based on the driving force of the internal combustion engine 2, the ECU 4 selects the reverse mode such that the first clutch C1 is disengaged, and the second clutch C2 is engaged. The driving force of the internal combustion engine 2 is transmitted from the input shaft 30 to the intermediate shaft 31 via the starting device 10, and is transmitted to the gear train 50 since the second clutch C2 is engaged. The rotation of the second clutch C2 is thus transmitted to the two-way clutch TWC through the first idler gear 51 and the second idler gear 52. The rotation of the gear train 50 is transmitted from the output shaft 33 to the drive gear 35, since the two-way clutch TWC is set to connect power transmission from the gear train 50 to the output shaft 33. The rotation of the drive gear 35 is transmitted to the differential device 80 via the counter shaft portion 60, and is transmitted to the wheels 8L, 8R through the left and right drive shafts 82L, 82R. The rotation of the intermediate shaft 31 is input to the primary pulley 41, which rotates the secondary pulley 42. The rotation is not transmitted to the output shaft 33 since the first clutch C1 is disengaged. In this way, the automatic transmission 3 is set to the reverse mode, and the driving force of the internal combustion engine 2 is transmitted to the wheels 8L, 8R via the second power transmission path a2.

As described above, in the automatic transmission 3 of the present embodiment, the first clutch C1 is positioned between the continuously variable speed change mechanism 40 and the portion of the second power transmission path a2 on the wheels 8L, 8R side, at which the second power transmission path a2 is coupled to the first power transmission path a1. At the same time, the first clutch C1 can be switched to the disengaged state for inertial traveling. When idling stop control is executed during deceleration or before stopping, the disconnected mode is selected and executed so that the internal combustion engine 2 and the continuously variable speed change mechanism 40 stop while the wheels 8L, 8R are rotating. The belt is thus prevented from slipping. Thus, it is possible to switch between forward traveling that uses the continuously variable speed change mechanism 40 and reverse traveling that does not use the continuously variable speed change mechanism 40 but uses the gear train 50. Also, other holding pressure generating portions such as an electric oil pump are unnecessary even when holding pressure is no longer generated due to the stoppage of the internal combustion engine 2 during idling stop control.

The first clutch C1 is disposed closer to the wheels 8L, 8R than the continuously variable speed change mechanism 40. Therefore, when the vehicle 1 is traveling forward inertially in a neutral state in which the first clutch C1 is disengaged, that is, during the disconnected mode, rotation from the wheels 81, 8R side is not transmitted to the continuously variable speed change mechanism 40. Thus, the deceleration rate can be further reduced, compared to the case where the continuously variable speed change mechanism 40 is co-rotated during inertial traveling.

In the automatic transmission 3 of the present embodiment, the first clutch C1 is positioned between the continuously variable speed change mechanism 40 and the portion of the second power transmission path a2 on the wheels 8L, 8R side, at which the second power transmission path a2 is coupled to the first power transmission path a1, in the first power transmission path a1. During forward traveling, impact torque input from the wheels 8L, 8R, which is generated when the vehicle 1 is traveling on a rough road, can be absorbed by the first clutch C1 (torque fuse) before the impact torque reaches the continuously variable speed change mechanism 40. Thus, it is possible to suppress belt slip which may occur if the impact torque reaches the continuously variable speed change mechanism 40. It is also possible to put the second clutch C2 in a disengaged state and change the speed using the continuously variable speed change mechanism 40 while the vehicle is stopped. For example, it is possible to start at a second speed.

When the reverse Clutch is disposed on the second axis, as described in Japanese Patent Application. Publication No. 63-57957 for example, the reverse clutch disposed on the second axis has multiple friction plates or has a friction plate with a large diameter due to the large transmission torque, in order to transmit driving force from the gear train to the output shaft during reverse traveling. Thus, there has been a problem that large drag resistance occurs with respect to the rotation of the output shaft when the reverse clutch is disengaged for forward traveling, which deteriorates fuel consumption.

In the automatic transmission 3 of the present embodiment, the second clutch C2 is disposed closer to the internal combustion engine 2 than the two-way clutch TWC in the second power transmission path a2. Therefore, the transmission torque required for the second clutch C2 can be decreased, compared to the case where the second clutch C2 is disposed closer to the wheels 8L, 8R than the continuously variable speed change mechanism 40 in the power transmission path a1. Thus, it is possible to reduce the number of friction plates or reduce the diameter of the friction plate of the second clutch C2. As a result, it is possible to reduce drag resistance with respect to the rotation of the output shaft 33, when the second clutch C2 is disengaged for forward traveling. The automatic transmission 3 allows drag resistance of the second clutch C2 for reverse traveling during forward traveling to be reduced, while also allowing switching between forward traveling using the continuously variable speed change mechanism 40 and reverse traveling using the gear train 50.

In the automatic transmission 3 of the present embodiment, the second clutch C2 is interposed between the intermediate shaft 31 that is coaxial with the input shaft 30 and the gear train 50. Thus, the second clutch C2 can be disposed on the input shaft 30 side in the first power transmission path a1. Therefore, when the second clutch C2 is disengaged for forward traveling, the number of gears in the gear train 50, which are rotated by power transmission from the first power transmission path a1 on the input shaft 30 side, can be kept at a minimum. Thus, rotational resistance that is generated due to the gears being rotated by power transmission can be reduced.

There are many cases where the required torque is the smallest on the input shaft 30 side in the second power transmission path a2. Compared to the case where the second clutch C2 is disposed in the first power transmission path a1 on the output shaft 33 side, the transmission torque required for the second clutch C2 can be kept at a minimum. Additionally, the number of friction plates of the second clutch C2 can be reduced greatly or the diameter of the friction plate can be reduced drastically. As a result, the drag resistance to the rotation of the output shaft 33 during forward traveling can be further reduced.

In the automatic transmission 3 of the present embodiment, the two-way clutch TWC is used as the third engagement element. However, the present disclosure is not limited to this. The third engagement element need only be disposed in the second power transmission path a2, closer to the wheels 8L, 8R than the second clutch C2, and connect/disconnect power transmission. For example, a dog clutch that engages/disengages by meshing or a friction engagement element may be used.

Figure 2:
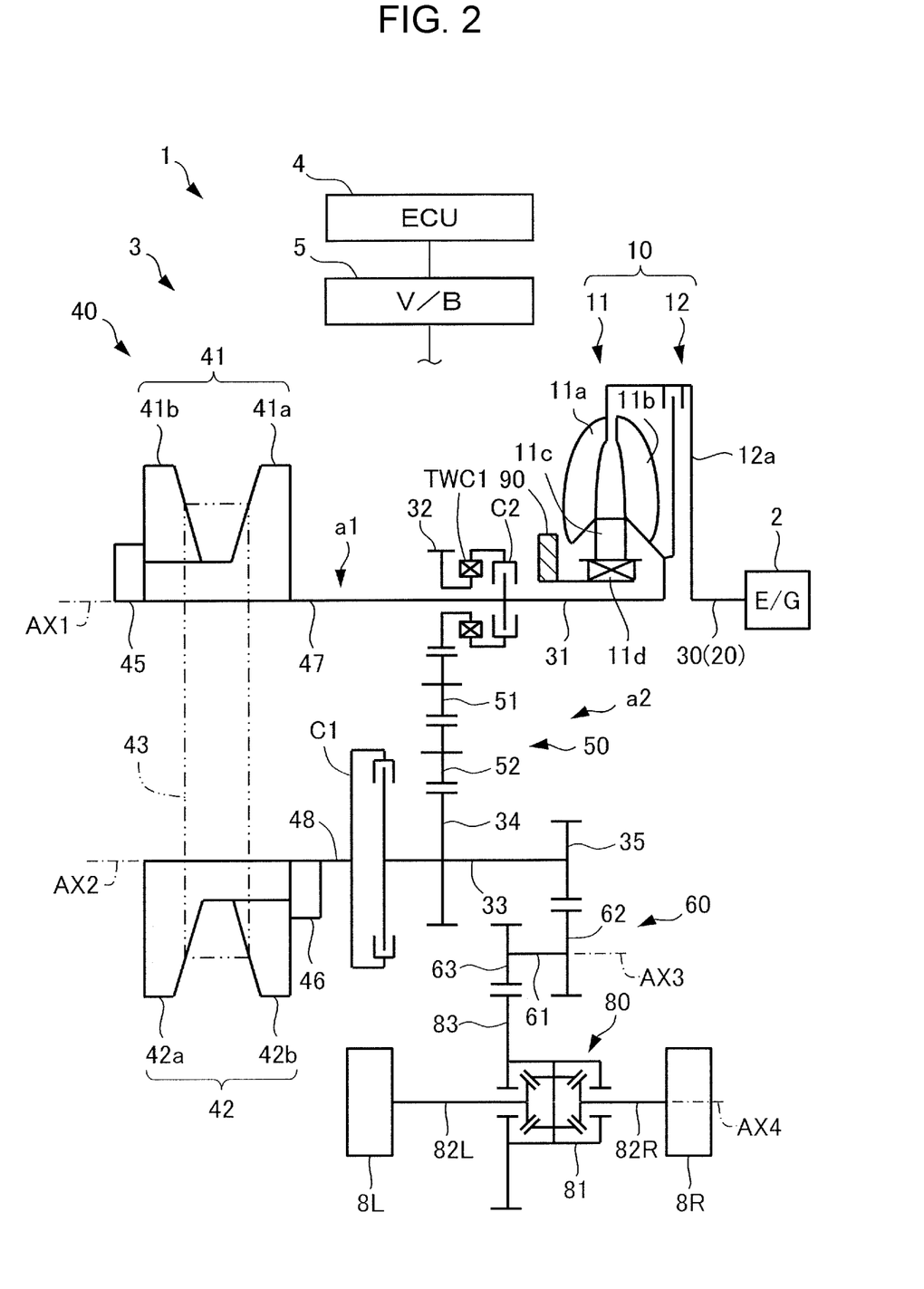
FIG. 2 is a skeleton diagram illustrating the vehicle installed with the automatic transmission according to a modification of the embodiment.

In the automatic transmission 3 of the present embodiment, the two-way clutch TWC is disposed in the portion of the second power transmission path a2 on the wheels 8L, 8R side, at which the second power transmission path a2 is coupled to the first power transmission path a1, and is interposed between the output shaft 33 and the gear train 50. However, the present disclosure is not limited to this. For example, as shown in FIG. 2, a two-way clutch TWC1 may be provided on the same axis as the intermediate shaft 31, and adjacently coupled to the second clutch C2 so as to be closer to the wheels 8L, 8R than the second clutch C2 in the second power transmission path a2. In other words, the two-way clutch TWC1 may be interposed between the second clutch. C2 and the gear train 50. In this case, the two-way clutch TWC1 is set to disconnect power transmission from the output shaft 33 side to the input shaft 30 side, and connect power transmission from the input shaft 30 side to the output shaft 33 side. When the vehicle 1 is traveling forward, the rotation of the output shaft 33 is transmitted to the gear train 50 but not to the second clutch C2. Also in this case, other holding pressure generating portions are unnecessary even when the internal combustion engine 2 stops and holding pressure is not generated during idling stop control, and the transmission torque required for the second clutch C2 is reduced. Therefore, drag resistance to the rotation of the output shaft 33 during forward traveling can be reduced.

Figure 3:
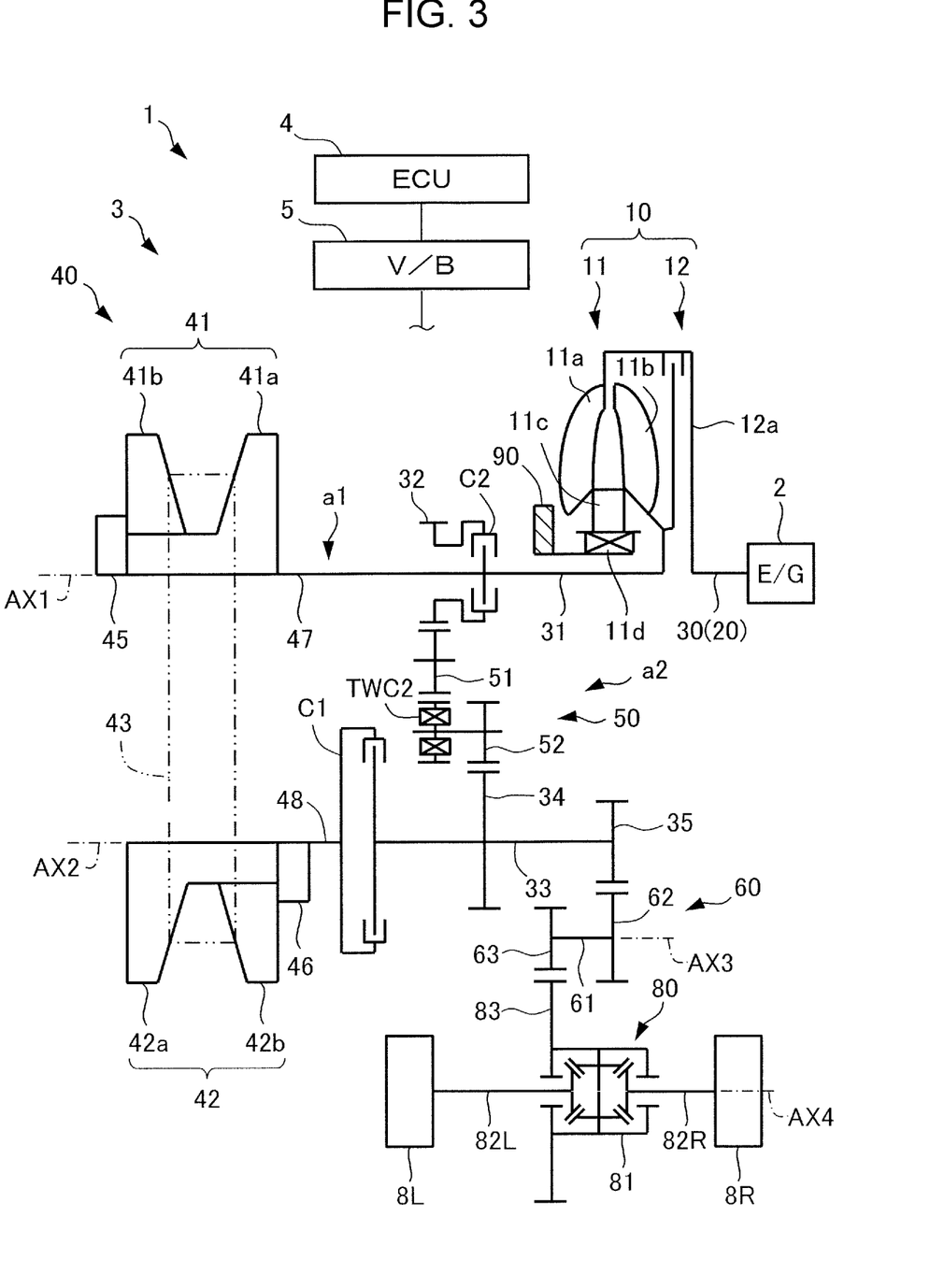
FIG. 3 is a skeleton diagram illustrating the vehicle installed with the automatic transmission according to a further modification of the embodiment.

Alternatively, a two-way clutch TWC2 may be interposed in the gear train 50, for example, between the first idler gear 51 and the second idler gear 52, as shown in FIG. 3. In this case, the two-way clutch TWC2 is set to disconnect power transmission from the output shaft 33 side to the input shaft 30 side, and connect power transmission from the input shaft 30 side to the output shaft 33 side. When the vehicle 1 is traveling forward, the rotation of the output shaft 33 is transmitted to the gear train 50 midway, but not to the second clutch C2. Also in this case, other holding pressure generating portions are unnecessary even when the internal combustion engine 2 stops and holding pressure is not generated during idling stop control, and the transmission torque required for the second clutch C2 is reduced. Therefore, drag resistance to the rotation of the output shaft 33 during forward traveling can be reduced.

In the automatic transmission 3 of the present embodiment, the second clutch C2 is interposed between the intermediate shaft 31 and the gear train 50. However, the present disclosure is not limited to this. For example, the second clutch C2 may be provided midway of the gear train 50. In both cases, the transmission torque required for the second clutch C2 can be reduced, compared to the case where the second clutch C2 is interposed between the output shaft 33 and the gear train 50. Also, the number of friction plates of the second clutch C2 or the diameter of the friction plate can be reduced. Therefore, the drag resistance to the rotation of the output shaft 33 during forward traveling can be reduced.

The present embodiment includes at least the following configuration. The automatic transmission (3) of the present embodiment includes: the input shaft (30) that is drivably coupled to the driving source (2) of the vehicle (1); the output shaft (33) drivably coupled to the wheels (8L, 8R); the continuously variable speed change mechanism (40) capable of continuously changing the speed ratio; the first engagement element (C1) that is interposed in a first power transmission path (a1) that couples the input shaft (30) and the output shaft (33) via the continuously variable speed change mechanism (40), and connects/disconnects power transmission by being switched to an engaged state for forward traveling and a disengaged state for reverse traveling; the second engagement element (C2) that is interposed between the input shaft (30) and the gear train (50) in the second power transmission path (a2) that couples a portion of the first power transmission path (a1) on the driving source (2) side of the continuously variable speed change mechanism (40) and the first engagement element (C1) and a portion of the first power transmission path (a1) on the wheels (8L, 8R) side of the continuously variable speed change mechanism (40) and the first engagement element (C1), via the gear train (50), and connects/disconnects power transmission by being switched to the engaged state for reverse traveling; and the third engagement element (TWC, TWC1, TWC2) that is disposed closer to the wheels (8L, 8R) than the second engagement element (C2) in the second power transmission path (a2) and connects/disconnects power transmission by being switched to the disengaged state, if at least the second engagement element (C2) is in the engaged state, for forward traveling, and to the engaged state for reverse traveling. In the automatic transmission (3), the first engagement element (C1) is positioned between the continuously variable speed change mechanism (40) and the portion of the second power transmission path (a2) on the wheels (8L, 8R) side, at which the second power transmission path (a2) is coupled to the first power transmission path (a1), and is capable of switching to the disengaged state for inertial traveling. With this structure, the first engagement element (C1) is positioned between the continuously variable speed change mechanism (40) and the portion of the second power transmission path (a2) on the wheels (8L, 8R) side, at which the second power transmission path (a2) is coupled to the first power transmission path (a1). At the same time, the first engagement element (C1) can be switched to a disengaged state for inertial traveling. When idling stop control is executed during deceleration and before stopping, the first engagement element (C1) is switched to the disengaged state so that the driving source (2) and the continuously variable speed change mechanism (40) stop with the wheels (8L, 8R) rotating, which prevents the belt from slipping. Thus, it is possible to switch between forward traveling that uses the continuously variable speed change mechanism (40) and reverse traveling that does not use the continuously variable speed change mechanism (40) but uses the gear train (50). Moreover, other holding pressure generating portions such as an electric oil pump are unnecessary, even when holding pressure is no longer generated due to the stoppage of the internal combustion engine (2) during idling stop control.

In the first power transmission path (a1), the first clutch (C1) is positioned between the continuously variable speed change mechanism (40) and the portion of the second power transmission path (a2) on the wheels (8L, 8R) side, at which the second power transmission path (a2) is coupled to the first power transmission path (a1). When the vehicle (1) is traveling forward, the impact torque from the wheels (8L, 8R) side resulting from a sudden brake can be absorbed by the first clutch (C1) before the impact torque reaches the continuously variable speed change mechanism (40). Thus, it is possible to suppress belt slip that may occur if the impact torque reaches the continuously variable speed change mechanism (40).

When the vehicle (1) is traveling in reverse, the driving force is output via the gear train (50). Therefore, there is no need to execute control of the continuously variable speed change mechanism (40) when the vehicle (1) is traveling in reverse, and it is possible to simplify control by the ECU (4). Since there is no need to generate holding pressure, the necessary hydraulic pressure is reduced compared to the case where holding pressure is generated, and the load on the driving source (2) can be reduced.

The second engagement element (C2) that is engaged for reverse traveling and disengaged for forward traveling is disposed closer to the driving source (2) in the second power transmission path (a2) than the third engagement element (TWC, TWC1, TWC2). It is possible to reduce the required transmission torque for the second engagement element (C2), compared to the case where the second engagement element (C2) is disposed in the first power transmission path (a1) closer to the wheels (8L, 8R) than the continuously variable speed change mechanism (40). Thus, drag resistance with respect to the rotation of the output shaft (33) can be decreased when the second engagement element (C2) is disengaged for forward traveling, since it is possible to reduce the number of friction plates of the second clutch (C2) or reduce the diameter of the friction plate. The automatic transmission (3) allows drag resistance of the second engagement element (C2) for reverse traveling during forward traveling to be reduced, while also allowing switching between forward traveling using the continuously variable speed change mechanism (40) and reverse traveling using the gear train (50).

The second engagement element (C2) is interposed between the input shaft (30) and the gear train (50). Thus, the second engagement element (C2) can be disposed in the first power transmission path (a1). Therefore, when the second engagement element (C2) is disengaged for forward traveling, the number of gears in the gear train (50), which are rotated by power transmission from the first power transmission path (a1) on the input shaft (30) side, can be kept at a minimum. Thus, rotational resistance that is generated due to the gears being rotated by power transmission can be reduced. There are many cases where the required torque is the smallest on the input shaft (30) side in the second power transmission path (a2). Compared to the case where the second engagement element (C2) is disposed in the first power transmission path (a1) on the output shaft (33) side, the transmission torque required for the second engagement element (C2) can be kept at a minimum. Additionally, the number of friction plates of the second engagement element (C2) can be reduced greatly or the diameter of the friction plate can be reduced drastically. As a result, the drag resistance to the rotation of the output shaft (33) during forward traveling can be further reduced.

The automatic transmission (3) of the present embodiment is switchable to the forward mode that enables forward traveling by causing the first engagement element (C1) to engage and causing the third engagement element (TWC, TWC1, TWC2) to disengage, to transmit driving force of the driving source (2) from the input shaft (30) to the output shaft (33) via the first power transmission path (a1), a reverse mode that enables reverse traveling by causing the first engagement element (C1) to disengage, causing the second engagement element (C2) to engage, causing the third engagement element (TWC, TWC1, TWC2) to engage, to transmit driving force of the driving source (2) from the input shaft (30) to the output shaft (33) via the second power transmission path (a2), and a disconnected mode that enables inertial traveling by causing h first engagement to disengage and causing at least one of the second engagement and the third engagement to disengage, to disconnect power transmission between the input shaft (30) and the output shaft (33). In the present structure, forward-reverse switching is possible by just switching between the forward mode and the reverse mode. Thus, there is no need to use a forward-reverse switching mechanism that uses a planetary gear for example, and the structure can be simplified.

In the automatic transmission (3) of the present embodiment, the third engagement element (TWC, TWC1, TWC2) is a two-way clutch. With this structure, power transmission can be connected/disconnected by engagement/disengagement due to wedge action or meshing. Thus, the need for energy supplied from outside for connecting/disconnecting can be eliminated and fuel consumption can be improved, compared to the case where a clutch operated by hydraulic fluid or electric power is used.

In the automatic transmission (3) of the present embodiment, the third engagement element (TWC, TWC1, TWC2) may be a dog clutch. With this structure, it is possible to increase the transmission torque when the third engagement element (TWC, TWC1, TWC2) is engaged, as well as surely disconnect power transmission when the third engagement element (TWC, TWC1, TWC2) is disengaged.

In the automatic transmission (3) of the present embodiment, the gear train (50) is composed of a plurality of idler gears (51, 52) that reverse the rotation transmitted from the input shaft (30) and transmit the reversed rotation to the output shaft (33). With this structure, there is no need to use a planetary gear with a complex structure as the gear train (50), thus the structure can be simplified.

INDUSTRIAL APPLICABILITY

The automatic transmission of the present disclosure can be used as an automatic transmission having a speed change mechanism which includes a continuously variable speed change mechanism that can continuously change the speed ratio, and is preferably used as an automatic transmission that can couple an input shaft and an output shaft without a continuously variable speed change mechanism interposed therebetween.

The invention claimed is:

1. An automatic transmission comprising:
   an input shaft drivably coupled to a driving source of a vehicle;
   an output shaft drivably coupled to a wheel;
   a continuously variable speed change mechanism capable of continuously changing a speed ratio;
   a first engagement element that is interposed in a first power transmission path that couples the input shaft and the output shaft via the continuously variable speed change mechanism, and connects and disconnects power transmission by being switched to an engaged state for forward traveling and a disengaged state for reverse traveling;
   a second engagement element that is interposed between the input shaft and a gear train, in a second power transmission path that couples a portion of the first power transmission path on a driving source side of the continuously variable speed change mechanism and the first engagement element and a portion of the first power transmission path on a wheel side of the continuously variable speed change mechanism and the first engagement element, via the gear train, and connects and disconnects power transmission by being switched to the engaged state for reverse traveling; and
   a third engagement element that is disposed closer to the wheel than the second engagement element in the second power transmission path and connects and disconnects power transmission by being switched to the disengaged state, if at least the second engagement element is in the engaged state, for forward traveling, and to the engaged state for reverse traveling, wherein
   the first engagement element is positioned between the continuously variable speed change mechanism and a portion of the second power transmission path on the wheel side, at which the second power transmission path is coupled to the first power transmission path, and is allowed to be switched to the disengaged state for inertial traveling.

2. The automatic transmission according to claim 1, wherein
   the automatic transmission is switchable to
      a forward mode that enables forward traveling by causing the first engagement element to engage and causing the third engagement element to disengage, to transmit driving force of the driving source from the input shaft to the output shaft via the first power transmission path,
      a reverse mode that enables reverse traveling by causing the first engagement element to disengage, causing the second engagement element to engage, causing the third engagement element to engage, to transmit driving force of the driving source from the input shaft to the output shaft via the second power transmission path, and
      a disconnected mode that enables inertial traveling by causing the first engagement element to disengage, and causing at least one of the second engagement element and the third engagement element to disengage, to disconnect power transmission between the input shaft and the output shaft.

3. The automatic transmission according to claim 2, wherein the third engagement element is a two-way clutch.

4. The automatic transmission according to claim 2, wherein the third engagement element is a dog clutch.

5. The automatic transmission according to claim 2, wherein the gear train includes a plurality of idler gears that reverse the rotation transmitted from the input shaft and transmit the reversed rotation to the output shaft.

6. The automatic transmission according to claim 1, wherein the third engagement element is a two-way clutch.

7. The automatic transmission according to claim 6, wherein the gear train includes a plurality of idler gears that reverse the rotation transmitted from the input shaft and transmit the reversed rotation to the output shaft.

8. The automatic transmission according to claim 1, wherein the third engagement element is a dog clutch.

9. The automatic transmission according to claim 8, wherein the gear train includes a plurality of idler gears that reverse the rotation transmitted from the input shaft and transmit the reversed rotation to the output shaft.

10. The automatic transmission according to claim 1, wherein the gear train includes a plurality of idler gears that reverse the rotation transmitted from the input shaft and transmit the reversed rotation to the output shaft.

* * * * *